Figure 1:
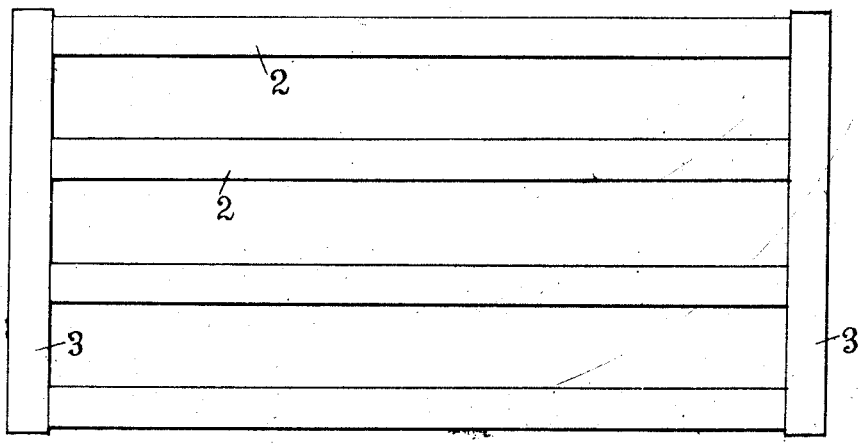

E. THOMSON.
METHOD OF ELECTRIC WELDING.
APPLICATION FILED JULY 10, 1909.

984,719.

Patented Feb. 21, 1911.

2 SHEETS—SHEET 1.

Witnesses:

Inventor
Elihu Thomson,
By his Attorneys

E. THOMSON.
METHOD OF ELECTRIC WELDING.
APPLICATION FILED JULY 10, 1909.

984,719.

Patented Feb. 21, 1911.
2 SHEETS—SHEET 2.

Witnesses:
Irene Lefkowitz
Edward M. Jellinek

Inventor
Elihu Thomson.
By his Attorneys
Townsend & Decker

UNITED STATES PATENT OFFICE.

ELIHU THOMSON, OF SWAMPSCOTT, MASSACHUSETTS, ASSIGNOR, BY MESNE ASSIGNMENTS, TO THOMSON ELECTRIC WELDING COMPANY, OF LYNN, MASSACHUSETTS, A CORPORATION OF MASSACHUSETTS.

METHOD OF ELECTRIC WELDING.

984,719.      Specification of Letters Patent.      Patented Feb. 21, 1911.

Application filed July 10, 1909. Serial No. 506,881.

*To all whom it may concern:*

Be it known that I, ELIHU THOMSON, a citizen of the United States, and a resident of Swampscott, in the county of Essex and State of Massachusetts, have invented certain new and useful Improvements in Methods of Electric Welding, of which the following is a specification.

My invention relates to the method of joining pieces of metal by the use of a heating electric current employed for the purpose of rendering the metal plastic so that it may serve to unite said pieces.

While my invention is applicable generally to the joining or uniting of pieces of metal of any form or intended for any use it is especially useful in uniting a rod or piece of metal at its ends respectively to the sides of two other rods or pieces and may therefore be advantageously employed in constructing various articles of metal manufacture, as for instance metal grills, grids or frames embodying a number of crosspieces united to end-pieces or pieces common to said cross-pieces. In the usual process of uniting pieces of metal by a butt welding process there is, of necessity, a shortening of the piece attendant upon the upsetting of the plastic metal at the joint under the endwise pressure applied in the operation. This involves a change in the dimension of the completed structure or in other words an alteration in the relative position of the two pieces due to the movement of one upon the other in the operation of forming the joint. Hence, in welding up a frame or grid having two or more crosspieces of definite dimensions, welding of the parts involving an upsetting in the ordinary sense is inadmissible if it be desired to do the work by welding the joints in succession or one after the other.

The object of my present invention is primarily to permit the union of the pieces in a simple and effective way using an electric current as the heating medium but without any attendant shortening of the pieces in the operation.

A further object is to enable the work to be done with a minimum amount of preliminary preparation or shaping of the material.

Generally stated, my invention consists in fixing the two pieces to be joined rigidly in their ultimate relative position and while maintaining them in that position crowding a uniting material adapted to become plastic by heat into a space provided between the pieces at their meeting portions and heating such uniting material to plasticity by passing a heating electric current from one to the other of said pieces. The metal or material so crowded into such space is preferably a separate piece of metal, but might be a portion of one of the pieces to be joined as will be more particularly hereinafter described. It is preferred, however, to use a separate piece of metal, in which case it is also preferred to form the same as a wedge and to provide a correspondingly formed space between the parts at their meeting portions into which the wedge-shaped piece may be crowded.

Other details and modifications of my invention will be more particularly hereinafter described and then specified in the claims.

Figures 2, 3:
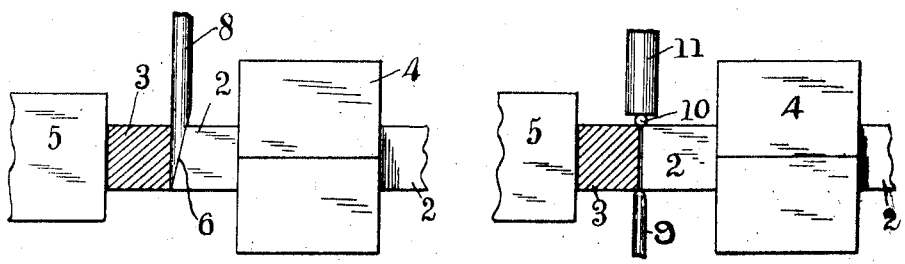
Figure 4:
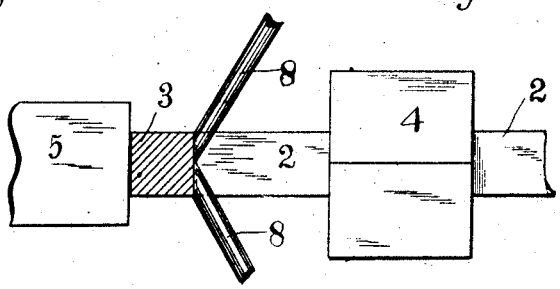
Figure 5:
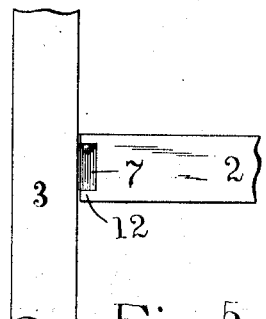
Figure 6:
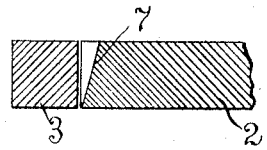
Figure 8:
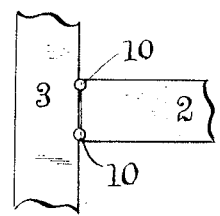
Figure 7:
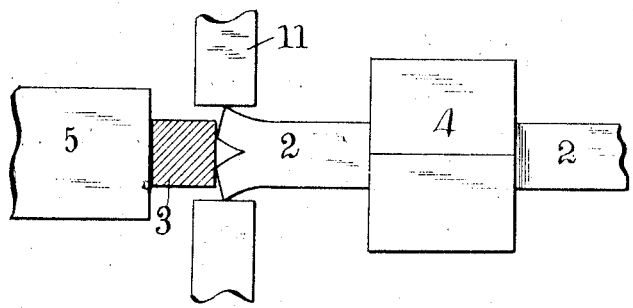
Figure 9:
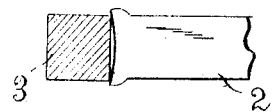

Referring to the accompanying drawings, Figure 1 represents a grid, to the construction of which my invention is applicable. Fig. 2 shows the parts to be united as assembled for the operation of joining them. Fig. 3 illustrates a modification of my invention where only moderate strength of union is required. Fig. 4 illustrates in side view further modification of the invention and Fig. 5 shows a preferred manner of forming one of the pieces so as to afford a space for the uniting material. Fig. 6 is a longitudinal section through the end-piece shown in Fig. 5. Figs. 7, 8, and 9 illustrate further modifications of the invention.

Referring to Fig. 1, the cross-pieces of the grid or frame are indicated at 2 while 3 shows the end or side pieces to which they are to be united.

In Fig. 2, 4 indicates a suitable clamp for rigidly holding or fixing the part 2 in the desired relative position to the part 3; and 5 indicates an abutment comprising preferably a block of copper or other good conducting material which holds the part 3 against displacement in the operation. These blocks or pieces 4 and 5 may constitute the means also for feeding heavy heating electric current to the pieces 2 and 3 as is usual in ordinary electric welding operations or such current may be supplied in other ways, and passed through the pieces from one to the other as well understood in the art.

The side-piece 3 being square, a space between the same and the end-piece 2 may be provided by beveling the end of piece 2 as indicated by the line 6. This bevel may extend from edge to edge of the piece 2 and either wholly or partially across the entire face of the end. In other words, the space between the pieces at the joint when they are assembled in their ultimate relative position and preparatory to the crowding in of the uniting material may embrace a whole or a part of the section at the point. It will be further apparent that the bevel instead of extending from side to side or edge to edge may extend only partially across, as indicated in Fig. 4, in which the piece 2 is shown as beveled from both edges. Moreover, the end may be formed with a groove as indicated in the plan Fig. 5, the base 7 of said groove being inclined and the sides being closed in by the material of the piece 2.

In Fig. 2 8 indicates a wedge-shaped piece of metal adapted to be forced in sidewise into the space between the pieces 2 and 3. The metal for this piece may be of the same or different material from that of pieces 2 and 3 according to the kind of joint required. In the operation of forming the joint, parts 2 and 3 are assembled and held rigidly in position shown, and the metal is pushed in sidewise while heating current is passed from one piece to the other. The metal of the wedge becomes plastic and adheres to the pieces joining them together and without any change of dimension of the structure or shortening of either of the component parts. Any projecting part of the wedge-shaped piece 8 may be removed or cut off after the operation, although it may be so proportioned as to complete the joint when pushed in and require no cutting off or dressing off.

When only moderate strength is required, the parts 2 and 3 may be assembled and held rigidly in position as before without any preliminary beveling or preparation of the ends or edges but with their flat faces not quite meeting so as to leave a space into which the uniting material may be crowded. Such uniting material may be a piece of metal 9 as shown which may be crowded against the two pieces over the space and which will be rendered plastic by the passage of the heating current. In this case the superfluous metal would have to be cut off. As shown in the same figure, the uniting material may be a small piece of metal 10 crowded into the space after being rendered plastic, by the use of a crowding tool, 11. Obviously, the piece of metal 10 may be so small that it will be practically all forced into the space and no dressing or cutting off be necessary. As already pointed out, the bevel or taper may be from both sides as indicated in Fig. 4 and the uniting material may be crowded in from both edges of the piece 2. As indicated in Fig. 5 the space may be in the form of a groove extending wholly or partially across the face of the piece 2, said space being then closed at its sides as at 12 by the material of the piece 2 so that the metal crowded into the space will be prevented from being forced out at the edges of the joint or will not show excepting at the wider end of the groove after the work is completed.

As shown in Fig. 7, the end-piece 2 may be slightly flared to provide a space into which the plastic metal may be forced by the crowding tool 11 without unnecessary movement or displacement of the parts 2 and 3 with relation to one another. In this case obviously, the plastic material is not a separate piece but consists of a part of the piece 2 itself.

As shown in Fig. 9, the flare may be of such form that the piece 2 will engage piece 3 on the corners of the latter when they are assembled, the action of the crowding tool being as before to crowd the metal down into the place afforded by the hollowing out of the end-piece 2.

Obviously, and as shown in Fig. 8, the uniting pieces, as 10, may be small pieces applied in spots as for instance at corners when great strength is not needed.

I do not limit myself in any way as to the shape of the space which receives the material rendered plastic by the current and forced or crowded into such space to form the union.

In constructing a grid, or frame, the two or more cross-pieces, as shown in Fig. 1, may be united successively to the end pieces 3 by simply moving the cross-piece 3 along longitudinally in front of the abutment 5 and bringing successive pieces 2 into position in the clamps or holders 4, and setting them in position, after which the passage of the electric current through the piece crowded into or inserted in the space will cause the latter to be heated to plasticity and to thus unite the pieces 2 and 3. Obviously in all these cases the union is effected without any change in the relative positions of pieces 2 and 3 or displacement or movement of either one after they have been assembled and fixed in the holding devices preparatory to the uniting operation. Hence, it is easy to cut the pieces 2 to their ultimate length desired in the completed structure and to weld them in position one at a time without departure from the ultimate desired form or dimension.

It will be obvious further that it would be within my invention to form a number of joints in the manner described at the same time by providing suitable devices for rigidly holding or fixing the parts of all the joints to be formed and then passing heating current through the pieces at all the meeting points and inserting, forcing or crowding the uniting metal into the spaces provided.

What I claim as my invention is:

1. The method of joining two pieces of metal consisting in setting the pieces rigidly in place for passage of a heating electric current, crowding a uniting material into a space between the pieces and passing a heating electric current from one to the other.

2. The method of joining the component parts of a metal structure without change of dimension, consisting in rigidly fixing the parts in their ultimate relative position crowding metal adapted to become plastic by heat into a space between the parts at the point of junction and passing heating electric current from one part to the other.

3. The method of joining two pieces of metal consisting in fixing them rigidly in position for passage of a heating electric current, wedging a piece of metal adapted to become plastic by heat into a space between the meeting portions of the pieces and passing a heating electric current from one to the other.

4. The method of joining the component parts of a metal structure without change of dimension, consisting in fixing the parts in place in their ultimate relative position, wedging metal adapted to become plastic by heat into a space between the parts at their meeting portions and passing heating electric current from one part to the other.

5. The method of joining a rod or piece of metal at its ends respectively to the sides of two other pieces by fixing the pieces in their ultimate relative positions and forcing metal adapted to become plastic by heat into the spaces between their meeting portions and passing an electric current from one part to the other as and for the purpose described.

6. The method of joining two pieces of metal consisting in fixing them rigidly in their ultimate relative position and, while maintaining them in such position, crowding a piece of metal into a space between the meeting portions of such pieces and passing a heating electric current from one piece to the other.

7. The method of joining two pieces of metal consisting in maintaining the pieces rigidly in their ultimate relative position, crowding a separate piece of metal adapted to become plastic by heat into a space between the pieces and passing a heating electric current from one to the other.

8. The method of joining two pieces of metal consisting in maintaining them rigidly in their ultimate relative position, crowding material adapted to become plastic by heat into a space between the meeting portions of the pieces and passing heating electric current from one to the other.

9. The method of joining two pieces of metal consisting in fixing and maintaining them rigidly in their ultimate relative position, forcing a separate piece of metal adapted to be rendered plastic by heat into a space between the meeting portions of the pieces and passing heating electric current from one to the other of said pieces.

10. The method of joining two pieces of metal consisting in fixing them in place and maintaining them fixed in their desired ultimate relative position and crowding a piece of metal rendered plastic by heat into a space between the meeting portions closed at its side by the material of said pieces.

11. The method of joining two pieces of metal consisting in holding them rigidly in their ultimate relative position and wedging a piece of metal rendered plastic by heat into a space between the pieces at their meeting portions closed at its sides by the material of said pieces.

12. The method of joining two pieces of metal to the sides of a third piece by setting the pieces and rigidly holding them in position, forcing pieces of metal into spaces between the meeting portions of the said two pieces and the third piece and passing a heating electric current from one part to the other.

13. The method of joining two pieces of metal together consisting in forming in the end of one of said pieces a groove having an inclined rear wall, fixing and maintaining said piece rigidly in position with its end presented to the piece to which it is to be joined, passing a heating electric current across the joint from one piece to the other and forcing a piece of metal endwise into said groove as and for the purpose described.

14. The method of joining two pieces of metal consisting in beveling the meeting portion of the pieces with a bevel inclined to the line of junction, setting said pieces in position and forcing a piece of metal into the space formed by the bevel and passing a heating electric current from one piece to the other in the line of the joint.

15. The method of joining two pieces of metal without change of dimension, consisting in setting the pieces and maintaining them rigidly in their ultimate relative position and uniting them by crowding metal adapted to be rendered plastic by heat and crowded by transverse pressure into a space provided at the meeting portions of the pieces and by passing heating electric current from one piece to the other to render the uniting material plastic.

16. The method herein described of joining three component parts of a metal structure comprising two end parts and an intermediate part consisting in fixing the parts rigidly in their ultimate relative position, crowding a uniting material adapted to be rendered plastic by heat into a space between the meeting portions of the end parts and intermediate part and passing a heating electric current from one part to the other to render such uniting material plastic.

17. The method of joining two pieces of metal consisting in holding them rigidly in their ultimate relative position and crowding a piece of metal adapted to become plastic by heat into a groove formed in the material of said pieces at their meeting portion and passing a heating electric current from one to the other of said pieces.

18. The method of forming a butt joint by providing a groove having a beveled wall in the end of one of the pieces to be joined, fixing the pieces in desired relative position and while maintaining them in such position inserting a piece of metal between the meeting portions and passing an electric current from one piece to the other.

Signed at Lynn in the county of Essex and State of Massachusetts this first day of July A. D. 1909.

ELIHU THOMSON.

Witnesses:
JOHN A. McMANUS, Jr.,
CHARLES A. BARNARD.